No. 634,608. Patented Oct. 10, 1899.
C. A. BOWSHER.
TELLURIAN.
(Application filed Nov. 12, 1898.)
(No Model.) 2 Sheets—Sheet 1.
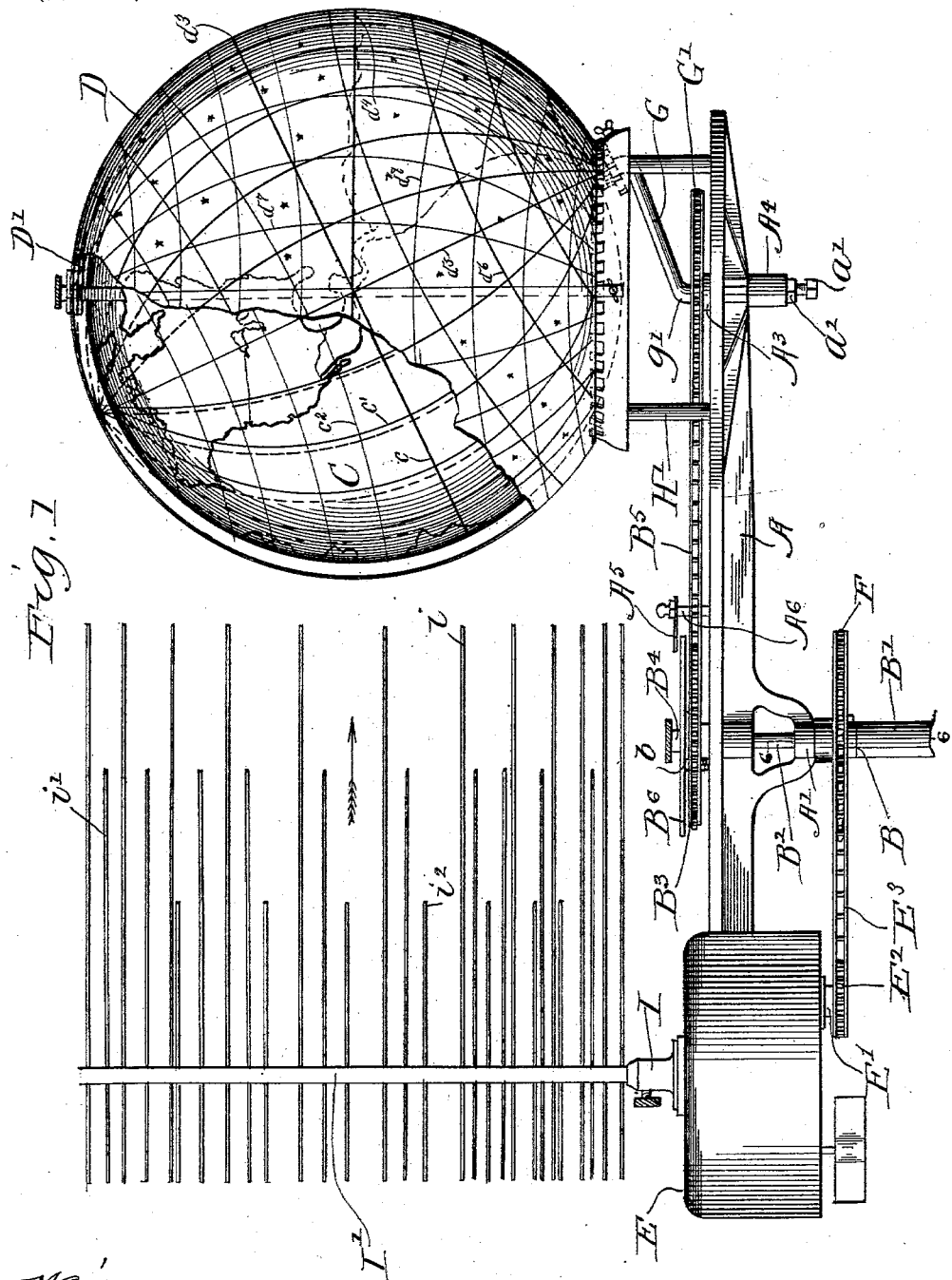
Witnesses
Harold G. Barrett
C. H. Crawford
Inventor
Columbus A. Bowsher
by Poole + Brown
Attys.

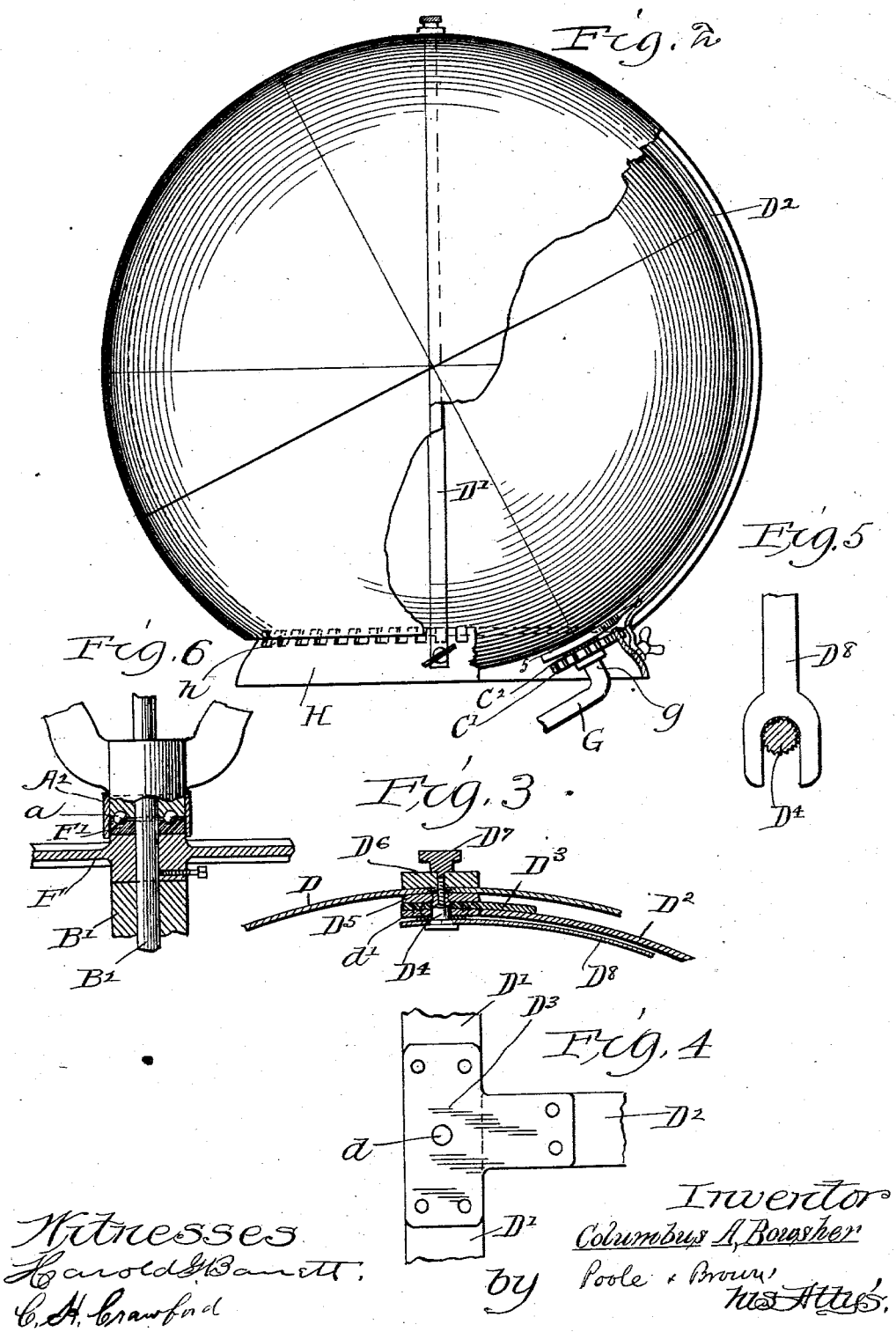

UNITED STATES PATENT OFFICE.

COLUMBUS A. BOWSHER, OF CHAMPAIGN, ILLINOIS.

TELLURIAN.

SPECIFICATION forming part of Letters Patent No. 634,608, dated October 10, 1899.

Application filed November 12, 1898. Serial No. 696,237. (No model.)

*To all whom it may concern:*

Be it known that I, COLUMBUS A. BOWSHER, of Champaign, in the county of Champaign and State of Illinois, have invented certain new and useful Improvements in Tellurians; and I do hereby declare that the following is a full, clear, and exact description thereof, reference being had to the accompanying drawings, and to the letters of reference marked thereon, which form a part of this specification.

This invention relates to improvements in that class of educational apparatus known as "tellurians," and refers more specifically to that class of tellurians which is designed to represent the yearly and diurnal movements of the earth, and illustrates the varying effects of heat, cold, daylight, and darkness resulting therefrom and producing the changes of seasons and the alternations of day and night. So far as the features of this portion of the invention are concerned they are generally similar to that shown in my prior patent, No. 548,798, granted to me on the 29th day of October, 1895.

The invention also relates as a further and distinct improvement to the application to a tellurian of this character of an outer shell or frame which envelops the globe representing the earth, said outer shell or frame being designed to represent the celestial sphere or lines corresponding to the celestial meridians and parallels by which the celestial latitudes and longitudes are determined and may be provided with marks or characters indicating the principal constellations of the celestial sphere. Said outer or enveloping shell or frame may be made of any suitable transparent material upon which the lines of one or more systems of coördinates may be inscribed, either temporarily or permanently, or may be made of reticulated framework, the members of which correspond with one or more systems of coördinates, so that the relative radial positions of constellations to the terrestrial or inner globe may be determined at a glance. Said outer shell will preferably be mechanically connected with the means by which the inner globe is rotated and revolved, so that in the organized apparatus the accurate relative positions of said globe and shell may be maintained.

The invention consists in the matters hereinafter set forth, and more particularly pointed out in the appended claims.

In the drawings, Figure 1 is a side elevation of a tellurian constructed in accordance with my invention, a portion of the outer shell being broken away. Fig. 2 is a view of the globe and shell from a position at right angles to the point of view of Fig. 1, a portion of the outer shell being broken away to more clearly show the arrangement of the parts. Fig. 3 is a detail section showing the manner of securing the outer shell in position and the means for connecting it with the motive power. Fig. 4 is a detail plan view of the frame by which the outer shell is held in position. Fig. 5 is a sectional detail taken on the line 5 of Fig. 2. Fig. 6 is a sectional detail taken on line 6 6 of Fig. 1.

In said drawings, A designates a horizontal bar or beam, and B designates as a whole a vertical supporting-standard upon which said beam A is mounted to rotate in a horizontal plane.

C designates a globe which is mounted upon one end of the beam A and representing the earth.

E designates a motor-casing which is mounted on the end of the beam A opposite the globe C and within which a suitable motor is placed.

The standard B consists of an outer tube B' and an inner shaft $B^2$. Upon the upper end of the tubular part B' of the supporting-standard is mounted a fixed sprocket-wheel F, said wheel being slipped over the shaft $B^2$ and fixed thereto by means of a set-screw, as shown in Fig. 6. The beam A is provided between its ends with a bearing, which consists of a depending hub A', which is supported by the hub of the fixed sprocket F. Preferably an antifriction-bearing will be interposed between said parts. As herein shown, a steel disk F' is slipped over the shaft $B^2$ and rests on the hub of the wheel F, and the adjacent faces of said disk and the hub A' are oppositely grooved to provide a ball-race, within which antifriction-balls $x$ are placed. Desirably a collar $A^2$ will surround the meeting ends of the hub A and the disk F' to prevent access of dust to the bearings. The motor within the casing E is provided with a vertical driving-shaft E', which projects downwardly from said motor and is provided at its lower end with a sprocket-wheel E², which is connected by a sprocket-chain E³ with the fixed sprocket-gear F on the standard B. With this construction when the motor-shaft C² revolves the beam A will be caused to rotate on the spindle B, as in the construction shown in my above-mentioned prior patent.

The globe C is mounted upon the upper end $g$ of a rotary spindle G, the lower end $g'$ of which is journaled in a vertical bearing A³ in the beam A. The spindle G is oppositely bent between its ends in two directions, so that its upper end $g$ is inclined at an angle of twenty-three and one-half degrees to the vertical, while at the same time the center of the globe D stands directly over the bearing A³ of said spindle. To said spindle is rigidly secured a sprocket-wheel G' just above the upper surface of the beam A, and a similar wheel B³ of equal size is rigidly secured upon the upper end of the vertical spindle B and in the same plane with the gear G'. Said gear B³ is rigidly attached to the shaft B² of the standard B, it being held in place by means of a set-screw passing through the hub thereof and impinging on the shaft, as shown. A sprocket-chain B⁵ connects the sprocket-wheels B³ and G' and causes the latter to rotate relatively to the frame A as said frame is revolved upon the spindle B.

The globe C is mounted to revolve freely upon the upper end $g$ of the spindle G, but is connected by a suitable ratchet mechanism with a toothed gear C', which is mounted upon the spindle so as to rotate independently thereof, said ratchet mechanism including a ratchet-wheel C², secured fixedly to the toothed gear C', and a suitable pawl (not shown) attached to the globe and engaging said ratchet, said pawl permitting said globe to be rotated in a direction the reverse of its proper movement relatively to said gear C', but held rigid with respect to said gear in the opposite direction. Said gear C' intermeshes with a surrounding circular toothed rack H, which is preferably made somewhat conical in shape, so that the teeth $h$ thereof will extend parallel to the axis of the gear at the moment of their engagement therewith. The rack H is arranged concentric with the bearing A³ of the spindle G and surrounds the lower portion of said globe. Said rack is herein shown as supported by pins or posts H', resting upon the adjacent outer end of the beam A. With this construction the relative rotation of the wheel G' and the spindle G with relation to the beam A as the latter revolves upon the standard B will cause the gear C' to travel around the interior of the rack H and produce a rotation of said gear and of the globe attached thereto, as in my said prior patent. The bearing A³ for the lower end of the spindle G is herein shown as including a suitable bearing-aperture in the beam A, through which the lower end $g'$ of the spindle is passed, and a pivot-screw $a'$, carried by a suitable sleeve A⁴, upon the point of which screw the lower end of said spindle rests, said construction being similar to that shown in my prior patent above mentioned. Said screw is secured against displacement by means of a jam-nut $a^2$.

B⁶ designates a disk or plate which is attached to the upper end of the shaft B² by means of a set-screw B⁴, said plate being separated from the sprocket-wheel by means of a suitable washer $b$. Said plate will be graduated upon its upper face to form a dial marked to indicate the four seasons of the year—spring, summer, autumn, and winter—the same as shown in my said prior patent, and also preferably divided to indicate the three months constituting each season. With this construction said plate may be easily and readily released or removed when it is desired to change its relative position to the globe C and without the necessity of disturbing the relation of the sprocket-chain B⁵ to the wheel B³. A pointer A⁵, supported from the beam A by means of a vertical post A⁶, is provided, which is adapted to coöperate with the said dial to indicate the different positions of the globe in its rotation about the axis of the support B.

At the opposite end of the beam A from the globe C is provided a standard I, upon which is supported a plurality of concentric rings I', as shown in my prior patent, No. 457,487, granted to me on the 11th day of August, 1891. In said rings are fixed three sets of wires $i$ $i'$ $i^2$, which are arranged concentric with the axis of said rings, said wires representing three concentric cylinders of sun's rays which strike three different zones on the earth globe corresponding with the rays of torrid, temperate, and frigid effect.

As a further and separate improvement I have provided for use in connection with tellurians of the general character described a second spherical shell or frame which surrounds said globe and designed for the purpose of indicating the positions of the celestial meridian, parallels, &c., with respect to their radial relations on the inner or earth globe. As herein shown, said outer part consists of a continuous transparent spherical shell concentric with the globe and arranged to rotate on an axis inclined to the earth's axis. Said outer or celestial shell may be provided with exterior lines indicating the celestial meridians and parallels by which the different constellations in said sphere are located and will be connected with a source of motive power, preferably through the driving means for the terrestrial globe, whereby said outer shell will be caused to rotate upon its axis once in each revolution of the earth in opposite direction to the earth's rotation, whereby the pole-star of the celestial sphere is maintained in its proper relative position to the north pole of the terrestrial globe. Said outer shell (designated by D) is made of a transparent material or meshed framework, whereby the outlines on the inner or terrestrial globe may be visible therethrough, celluloid, glass, or fine wire being a suitable material for this purpose. Said shell will preferably be made of two parts or hemispheres joined on vertical meeting-lines, as shown in Figs. 1 and 2, and secured rigidly together by any suitable means permitting the same to be readily separated and removed. The means for supporting said outer or celestial shell in place over the inner or terrestrial globe are made as follows:

$D'$ $D^2$ designate curved strips, which are attached at their lower ends to the circular rack H and pass upwardly outside of the inner globe and are joined at their upper ends vertically above the bearing $A^3$ of the spindle G. The strips $D'$ $D'$ are arranged at the side of the globe C with relation to the other parts of the apparatus and in the same plane, while the strip $D^2$ is arranged at the rear of the globe and in a plane perpendicular to the plane of the strips $D'$. Said strip $D'$ may be made from a single half-circular piece, if desired, and attached at its opposite ends to the opposite sides of the rack H. Said strips are rigidly joined above the globe C by means of a trifurcated plate $D^3$, as shown in Fig. 4. The strips connected as described constitute an arched frame upon which the outer shell is supported over the inner globe, said frame being located in the completed apparatus between the inner globe and shell. The means for connecting said frame with the outer shell are made as follows:

$D^4$ designates a vertical spindle which passes upwardly through and has rotative engagement with an aperture $d$ in the frame-strips $D'$ and connecting-plate $D^3$. Said spindle is provided above said connecting-plate with a washer $D^5$, which is limited in its downward movement thereon by a shoulder, as shown. $D^6$ designates a second washer located above the washer $D^5$ and adapted to coöperate with the latter to clamp the meeting edges of the hemispheres of the spherical shell D at the upper portion thereof, said washers being clamped together by means of a screw-bolt $D^7$, which has screw-threaded engagement with an axial aperture in the spindle $D^4$. The clamping-faces of the washers $D^5$ $D^6$ are made spherical to correspond with the curvature of the shell D. Additional fastening means may be provided at the sides of the shell to prevent accidental separation of the same. The adjacent faces of the plate $D^3$ and washer $D^5$ are flat and lie in parallel horizontal planes and form the bearing between the supporting-frame and shell, upon which the latter is supported and turns. An antifriction-bearing of suitable construction may, however, be substituted, if found desirable, for the flat or shoulder bearing shown. The lower portion of said shell is cut away in a horizontal plane and is arranged with its lower edge outside of the frame-strips $D'$ $D^2$, so as to clear the same in its rotation upon its axis. The spindle $D^4$ is coincident with the axis of rotation of the shell D, said axis being in line with the bearing $A^3$ of the spindle and at an angle of twenty-three and one-half degrees from the axis about which the inner or terrestrial globe rotates. Said spindle is also located at one of the poles of the celestial sphere, from which one set of the celestial meridians emanate, as will be hereinafter more fully explained.

The means herein shown for rotating the outer shell upon its axis consists of a curved actuating-arm $D^8$, located between the inner globe C and the frame-strips $D'$ $D^2$ and connected at one end with the rotative spindle $D^4$ (to which the globe is clamped, as before explained) and at its other end with the upper end of the spindle G. Said spindle $D^4$ is extended slightly inside of the frame-strips, with which it has rotative bearing and is non-rotatively connected with the upper end of said actuating-arm, as most clearly shown in Fig. 3. A washer is interposed between the upper end of said arm and the frame-strips $D'$ $D^2$, so as to hold said bar out of contact with the frame members in its movement around the same. The lower end of said actuating-arm is bifurcated and fits over the spindle G, whereby motion of the spindle is communicated to the bar and therethrough to the outer or celestial globe. With this construction it will be obvious that as the upper end of the spindle G is moved about the circular rack it will cause the actuating-arm $D^8$ to move in a circular path about the inner or terrestrial globe, which, owing to its rigid connection with the spindle $D^4$, will cause the outer shell to rotate on its axis in a direction the reverse to that of the terrestrial globe.

The line $c$ indicates the equator on the inner or terrestrial globe, the lines $c'$ the meridians, and the lines $c^2$ the parallels thereon. The celestial sphere or shell is provided with two sets of coördinates, the base of one being a line $d^3$, which is located in the plane of the terrestrial equator, and the base of the other being a curved line $d^4$, corresponding with the circle of the ecliptic. $d^5$ $d^6$ designate lines representing the meridians and parallels, respectively, of the equatorial system of coördinates, and $d^7$ $d^8$ designate lines representing the meridians and parallels, respectively, of the ecliptical system of coördinates. The different lines of the celestial sphere or shell mentioned may be made permanent or the shell made plain, whereon the lines may be inscribed at pleasure, and one or both sets of coördinates may be employed at the same time, as desired. Furthermore, instead of providing a surrounding shell upon which the lines representing the coördinates may be inscribed I may provide a spherical reticulated frame the parts of which may represent the lines of a system or systems of coördinates.

The astrotellurian is devised for the purpose of presenting to the mind the radial relations of the universe to the earth at any time of the year, whereby the stars or their constellations may be considered as though the point of observation were located beyond the visible stellar system, locating its parts by the celestial latitude and longitude and using the earth and its orbit as a position or basis for reference.

I claim as my invention—

1. In an astrotellurian, the combination with a globe which represents the earth, means for giving motion to the same to represent the annual and diurnal movements of the earth, and a spherical shell or frame surrounding said globe which represents the celestial sphere, and means for giving relative motion to said globe and shell to correspond to the real and apparent motions of the earth and celestial sphere.

2. In an astrotellurian, the combination with a globe representing the earth, driving means for giving motion to the same to imitate the annual and diurnal movements of the earth, and a shell surrounding said first-mentioned globe and representing the celestial sphere, said shell being connected with said driving means.

3. In an astrotellurian, the combination with a globe representing the earth, and a shell surrounding the same and representing the celestial sphere, said shell being provided with two systems of coördinates, the bases of which are located in the planes of the terrestrial equator and of the ecliptic, respectively.

4. In an astrotellurian, the combination with a rotating frame and a globe mounted on one end thereof representing the earth, of a shell surrounding said first-mentioned globe and representing the celestial sphere, and a supporting-frame for said shell, said supporting-frame being located between the globe and shell and secured at the lower end thereof to said rotating frame.

5. In an astrotellurian, the combination with a rotating frame, and a globe on one end thereof representing the earth, of a shell surrounding said first-mentioned globe and representing the celestial sphere, and a frame for holding said shell in place comprising a plurality of curved strips attached at their lower ends to said rotating frame and intersecting and connected together at their upper ends, and a spindle attached to said shell and having rotative engagement with said supporting-frame.

6. In an astral tellurian, the combination of a globe which represents the earth, means for giving motion to the same to represent the annual and diurnal motions of the earth, and a spherical shell surrounding the globe which represents the celestial sphere; said shell consisting of two detachably-united hemispheres, and means for giving relative motion to the globe and shell to correspond with the real and apparent motions of the earth and celestial sphere respectively.

7. In an astrotellurian, the combination with a rotating frame, a globe on said frame representing the earth, of a shell surrounding the first-mentioned globe and representing the celestial sphere, means for supporting said shell consisting of a frame mounted on said rotating frame and extending between said globe and shell, said frame being provided at its upper end with a bearing, a spindle attached to the upper side of said shell and rotatively engaging said bearing, and an actuating-arm non-rotatively connected at its upper end with said spindle and at its lower end with the driving means for the globe.

8. In an astrotellurian, the combination with a rotating frame, a globe on said frame representing the earth, of a shell surrounding the first-mentioned globe and representing the celestial sphere, means for supporting said shell in position, comprising a frame mounted on said rotating frame and provided in its upper part with a bearing, a spindle rotatively engaging said bearing, clamping means on said spindle engaging said shell, and means for rotating said spindle.

9. An astrotellurian comprising a supporting-standard, a rotary frame pivotally mounted on said standard, a motor on said frame provided with a sprocket-wheel, a fixed sprocket-wheel on the standard, a sprocket-chain connecting the two wheels, a rotary shaft on the frame provided with a sprocket-wheel, a second stationary sprocket-wheel, a sprocket-chain connecting the two last-mentioned sprocket-wheels, a globe rotatively mounted on said rotary shaft, a shell surrounding said first-mentioned globe and arranged to rotate on an axis independent of the axis of the inner globe, and means for rotating said shell from the said rotary shaft.

10. A tellurian, comprising a supporting-standard, a frame provided with a depending hub supported upon said standard, a pivot-shaft in the upper end of said standard extending upwardly through said hub, antifriction-bearings between said hub and standard, a motor on said frame provided with a sprocket-wheel, a fixed sprocket-wheel on the standard, a sprocket-chain connecting the two wheels, a rotary shaft on the frame provided with a sprocket-wheel, a second stationary sprocket-wheel on the upper end of said pivot-shaft, a sprocket-chain connecting the two last-mentioned sprocket-wheels, a globe rotatively mounted on said rotary shaft, a spherical shell surrounding said globe and arranged to rotate on an axis independent of the axis of rotation of said globe, and means for rotating said shell from said rotary shaft.

11. A tellurian, comprising a supporting-standard, a frame pivotally mounted on said standard, the upper end of the standard projecting through said frame, a motor on one end of the frame provided with a sprocket-wheel, a stationary sprocket-wheel on the standard, a sprocket-chain connecting the two wheels, a globe-carrying spindle at the end of the frame opposite to the motor, a sprocket-gear rigidly secured to said spindle, a stationary sprocket-gear attached to the upper end of the standard, a sprocket-chain connecting said last-mentioned sprocket-wheels, a dial for indicating the seasons of the year attached to the upper end of the shaft above and separately from the sprocket, whereby it may be removed without disturbing said wheel, and a pointer on the frame adjacent to said dial.

In testimony that I claim the foregoing as my invention I affix my signature, in presence of two witnesses, this 26th day of September, A. D. 1898.

COLUMBUS A. BOWSHER.

Witnesses:
 WILLIAM L. HALL,
 C. W. HILLS.